W. PRANGLEY.
Improvement in Commodes.
No. 132,775. *Fig. 1.* Patented Nov. 5, 1872.
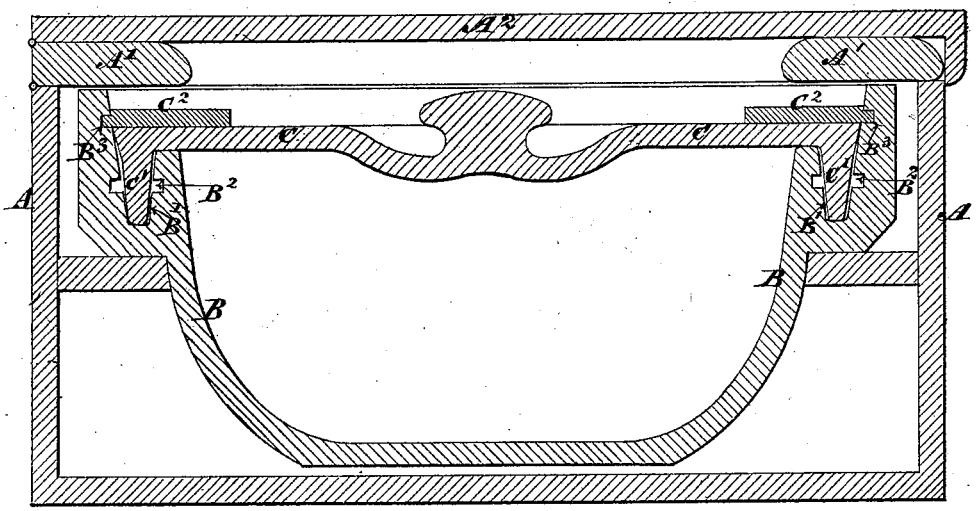
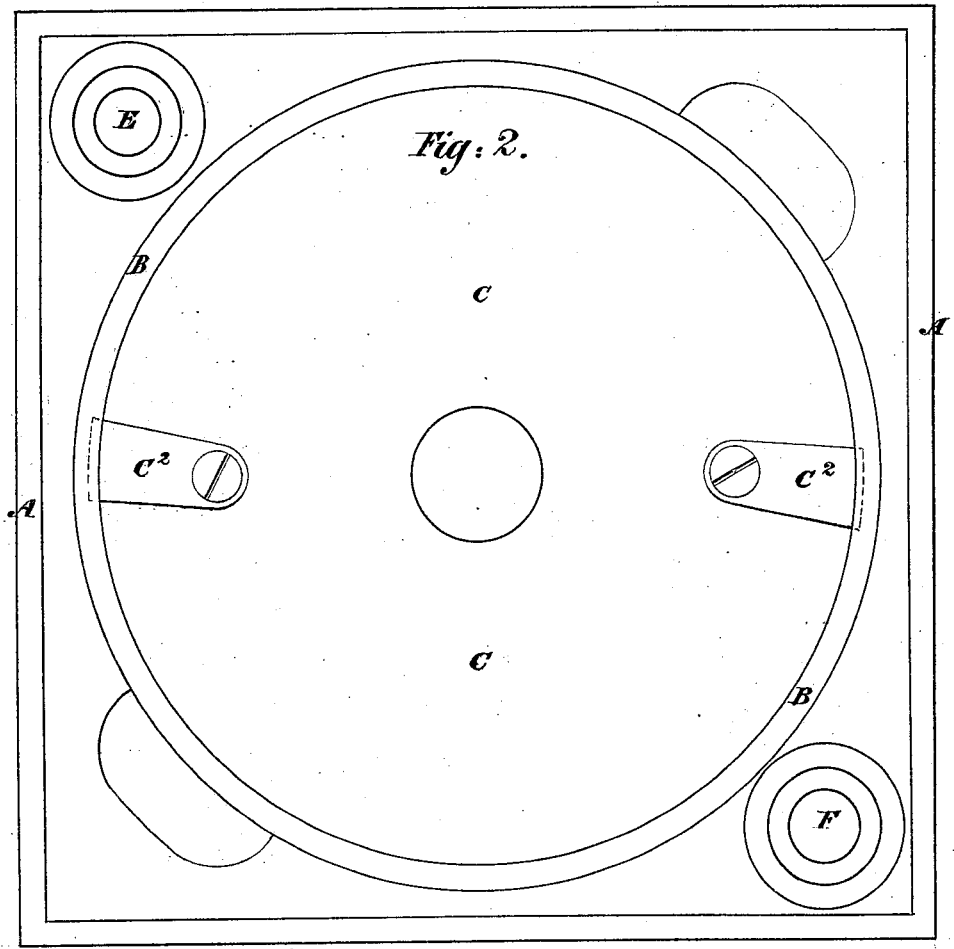

UNITED STATES PATENT OFFICE.

WILLIAM PRANGLEY, OF SALISBURY, ENGLAND.

IMPROVEMENT IN COMMODES.

Specification forming part of Letters Patent No. 132,775, dated November 5, 1872.

*To all whom it may concern:*

Be it known that I, WILLIAM PRANGLEY, of Salisbury, in the county of Wilts, England, a subject of the Queen of Great Britain, have invented or discovered new and useful "Improvements in Commodes or Portable Water-Closets;" and I, the said WILLIAM PRANGLEY, do hereby declare the nature of the said invention, and in what manner the same is to be performed, to be particularly described and ascertained in and by the following statement thereof; that is to say—

This invention has for its object improvements in commodes or portable water-closets. For this purpose the pan of the commode is formed at the top with a V-shaped trough around it and with recessed grooves around each of the sides of the V-trough. The lid of the pan is formed with a wedge-shaped ring projecting from its under side to enter the trough at the top of the pan, and means are provided for securing the lid to the pan. Before the lid is placed over the pan of the commode a small quantity of water is poured into the trough before mentioned, and when the wedge-projection on the lid enters the trough the water displaced by it rises up in the trough and enters the recessed grooves formed around its sides. The pan is thus hermetically closed. The commode-pan is placed into a box or case covered over with a suitable lid. The lid is hinged to the back of a seat which comes above the top of the pan, and this seat is hinged to the back of the box, so that when the seat is turned up the pan can be lifted out. The corners of the box or case are fitted to receive bottles to contain a supply of water for forming the water-joint for the lid, and also, if desired, for containing disinfecting-fluids.

In the drawing hereunto annexed I have shown a commode or portable water-closet, constructed as above described.

Figure 1 is a vertical section of the commode or closet when closed. Fig. 2 is a plan view of the same with the lid and seat removed.

A is the exterior box or case, having hinged to it at the top the seat $A^1$, to which is hinged the lid $A^2$. B is the earthenware pan, having around it at the top a wedge-shaped groove or trough, $B^1$, with a recessed groove, $B^2$, around each of its sides. C is the pan-lid, also of earthenware, and having a wedge-shaped projection, $C^1$, on its under side to enter the groove $B^1$. $C^2$ are turn-buttons carried on the top of the lid. When the lid has been placed onto the pan the buttons $C^2$ are turned round so that their ends, which are made wedge-shaped, enter a groove, $B^3$, formed around the interior of the upper part of the pan, and the lid is by them held firmly down onto the top of the pan. E is a bottle for containing water for charging the trough $B^1$, and F is a bottle for containing disinfecting-fluid.

The commode or portable closet above described I call "The Universal," as it is complete in itself. It will be seen that it can be applied to the ordinary commode stand or frame at a small cost, and that there is no possibility of any effluvia escaping from it. On an emergency it can be used with comfort and safety in any room, closet, or private carriage, on a low seat, hassock, or footstool, and in a fitting compartment may be taken advantage of during a journey by railway. It is invaluable in the rooms of invalids, and for hospitals, infirmaries, colleges, schools, hotels, baths, nurseries, ship's cabins, and such like, is an indispensable, and, being so compact, it may be kept in the drawer of a wardrobe or other piece of bedroom furniture, ready for instant use, as it requires but momentary preparation. In price it is within reach of every cottager, and when once purchased entails no after expense. No sleeping apartment in a respectable establishment will in future be considered furnished without one. It is an immeasurable boon to persons traveling who may be suffering from diarrhea or violent relaxation of the bowels from any cause.

Having thus described the nature of my invention and the manner of performing the same, I would have it understood that what I claim is—

1. The pan constructed as set forth, with an annular water-trough near its top having lateral grooves into which water is forced by displacement when the cover is applied, to pack the joint securely.

2. The combination of the pan, the annular water-trough, the rim having a flange to enter the trough, the locking-buttons on the lid, and the grooves in the interior of the rim, these members being constructed and operating substantially as set forth, to lock the cover securely in place and to form a tight joint.

3. The combination of a pan having an external supporting-flange and a water-jointed cover with a case having a seat, a cover, and an internal supporting-ledge on which the flange of the pan rests, these members being constructed and operating substantially in the manner set forth, to seal the pan hermetically and hold it securely during transportation.

4. A portable commode, constructed as set forth, with receptacles for a pan and for vessels to contain water and disinfectants.

WM. PRANGLEY.

Witnesses:
 WILLM. YOUNG,
 THO. VERRINDER,
*Clerks to Messrs. Macdonald & Broderick,*
   *Notaries Public, Salisbury.*